H. E. SESSIONS.
METHOD OF DELINTING COTTON SEED HULLS AND RECOVERING UNCUT SEED.
APPLICATION FILED DEC. 17, 1915.
1,253,894.
Patented Jan. 15, 1918.
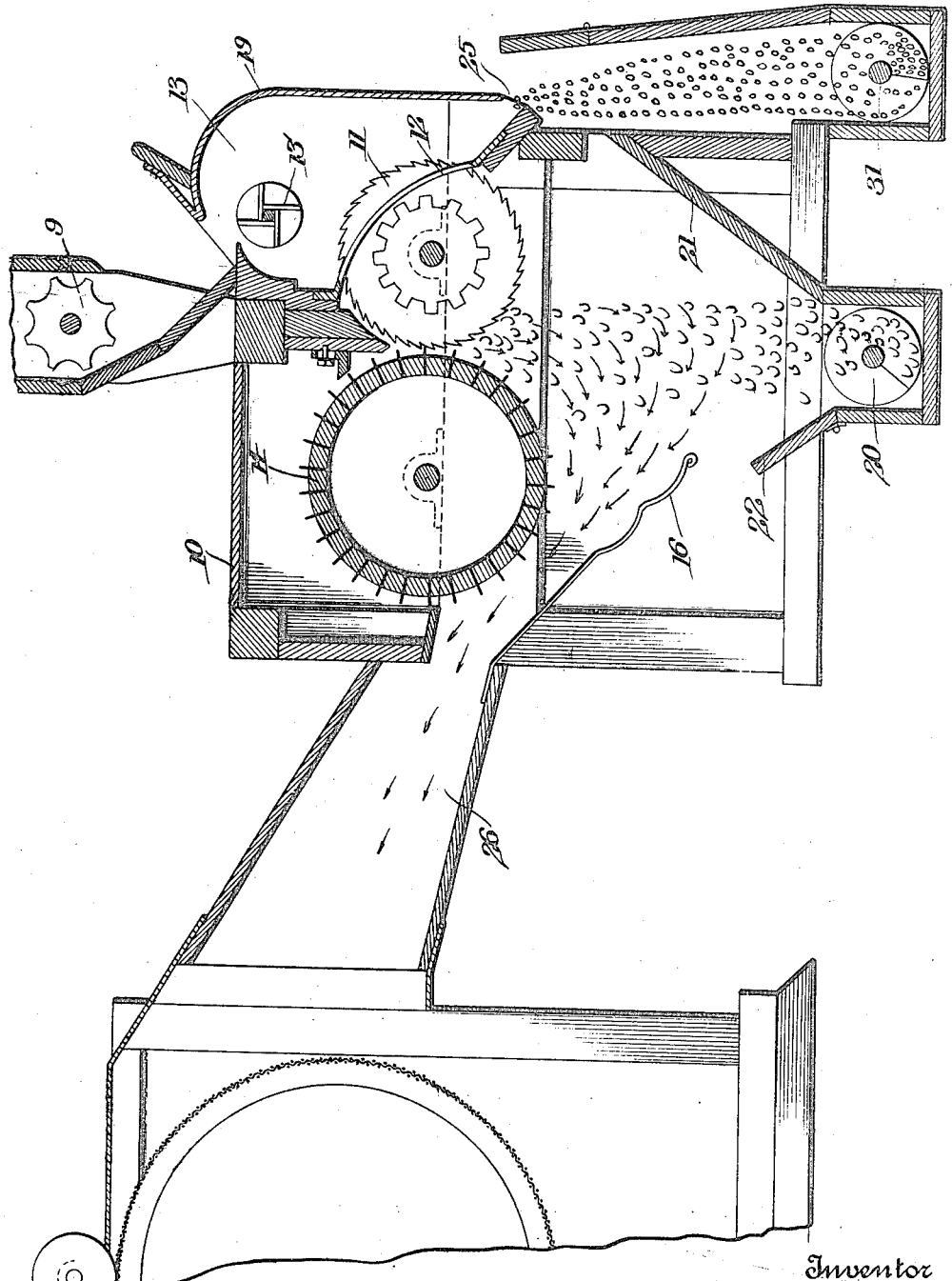

UNITED STATES PATENT OFFICE.

HUGH E. SESSIONS, OF COLUMBIA, SOUTH CAROLINA.

METHOD OF DELINTING COTTON-SEED HULLS AND RECOVERING UNCUT SEED.

1,253,894.

Specification of Letters Patent.

Patented Jan. 15, 1918.

Application filed December 17, 1915. Serial No. 67,461.

*To all whom it may concern:*

Be it known that I, HUGH E. SESSIONS, a citizen of the United States, and resident of Columbia, county of Richland, State of South Carolina, have invented certain new and useful Improvements in Methods of Delinting Cotton-Seed Hulls and Recovering Uncut Seed, of which the following is a specification.

This invention relates to the removal of fine particles of lint from cotton seed hulls after the meats have been removed from the hulls by a hulling machine. In order to be able to readily separate the meats from the hulls after the hulling operation, it is best to set the hulling machine so that it comes as near as possible, taking the meats out of the hulls whole. This is for the reason that the more the meats are broken the more fine meats will be produced and these fine meats will get entangled in the lint on the hulls, after which it is very hard to separate them and this results in a high loss in separation. So, the coarser the hulling within reason, the less loss there will be in separating the meats from the hulls, and the lint on the hulls will then be practically free of meats and may be more readily removed.

The best separation is obtained when the hulling is coarse enough to allow a few uncut seed to pass through the huller. The uncut seed that pass through the huller are carried out with the hulls, as they are too large to go through the screening device which separates the meats from the hulls. My invention also contemplates separating these uncut seed from the hulls so they may be returned to the hullers. In this way the seed passing through the hullers uncut are reclaimed when otherwise they would have been carried out with the hulls and sold with the hulls at less than one-fourth the price they are worth,—in other words, they would be sold as hulls at about ten dollars per ton when the seed are worth about forty dollars per ton, as at this time.

The hulls are rather light and somewhat brittle and before they were removed from the meats the effort had been made by the linting machines to remove all of the lint from the seed. Some short particles of lint, however, still adhere to the hull and that lint is of value and it is the purpose of the present invention to remove as much of it as possible from the hulls without materially injuring or changing the characteristics of the hulls themselves. It has heretofore been proposed to remove some of this lint by methods or machines which make use of a rubbing action but it has been found that while this may remove some of the lint it at the same time so changes the appearance and condition of the hulls that they are no longer marketable for the same purpose as hulls not so treated. I have discovered that the lint may be removed by subjecting the hulls to a rapid succession of small cutting blows which loosen the lint from the hull and which may to a certain extent also disintegrate the hulls. The lint and hulls together are then passed in a scattered or separate condition through an open space and subjected to the action of a gentle current of air passing through them, the current being sufficient to carry off the loosened particles of lint but not sufficient to carry off the heavier particles of hulls.

My process may of course be carried out by the use of various forms of mechanism but as illustrating one form which has been found practicable for the purpose, reference is made to the accompanying drawing.

The drawing consists of a cross section of a machine adapted to carry out my process.

In the drawing, 10 represents the outer casing within which the operating mechanism is contained. The mechanism includes a saw cylinder 11 of the same type as those used in ordinary delinting machines. The saw disks pass in between adjacent ribs 12. A brush cylinder 14 is mounted in the casing with the ends of the bristles almost touching the saw teeth and this brush cylinder has a greater peripheral speed than the saw cylinder. The hulls and uncut seed which passed through the hulling machine are fed to the delinting and separating machine by any suitable feeding device illustrated diagrammatically at 9 and they enter the space above the saw cylinder 11 and are retained in contact with the saw cylinder by the outer part 19 of the casing. Within the chamber 13 formed by this part 19, the hulls rest upon the saw cylinder and are engaged in succession by the teeth on the rotating disks. The ribs 12 are disposed close together and the saw teeth passing between carry the lint through the ribs. The hulls are broken up in such a manner that they will work their way through the ribs and also be pulled through by the saws, dropping downwardly in a shower with the lint. The float 13' in the chamber 13 is used to assist in agitating the mixture of hulls and seed in the chamber, the seed being separated from the hulls at the lower part of the chamber 13 for the reason that the ribs are so close together that the whole seed will not pass through them, and the whole seed naturally being heavier will work their way down to the bottom of the chamber 13 and will be discharged through the opening 25, which may be provided with a hinged closure adapted to be opened when desired. From the opening 25 the whole seed are discharged into a conveyer 31, and these seed are returned to the hullers along with the other seed to be hulled.

In operation the saw teeth engage the hulls giving to them rapid cutting blows which serve to remove the particles of lint from them and the saw teeth not only carry the lint between the ribs 12 but also carry the hulls themselves. The hulls and lint are then brushed downward by the brush cylinder from the saw teeth and are discharged in a shower or scattered condition into the open space in the casing below the saw and brush. They pass downwardly through the air and by reason of the arrangement of the adjustable board 16 in reference to the brush cylinder 14 a current of air will pass upwardly through the falling particles toward the lint discharge outlet 26. The particles of lint will float downwardly and will gradually be arrested in their descent by the rising current of air and by reason of the particular arrangement there will be a regulated cyclone-like movement of the air carrying off the lint, as indicated by the arrows, but permitting the hulls to pass downward. At the bottom of the apparatus I preferably provide a conveyer 20 into which the delinted hulls fall, an adjustable partition 22 serving to guide them into the conveyer on one side and the partition 21 serving to guide them on the other side. I find that the rapid action of the saw teeth on the hulls not only serves to effectually break lose the lint but at the same time it leaves the hulls themselves in the same loose physical condition which they had prior to the operation and therefore the hulls have the same value commercially as if they had not been subjected to this delinting operation. Knowing that the uncut seed mixed with the hulls will be reclaimed, a coarser hulling is permissible in the first place, which improves the separation of the meats from the hulls, and also enables the lint on the latter to be more readily removed.

Having thus described the invention, what is claimed and desired to be secured by Letters Patent is:

1. The method of removing lint from cotton seed hulls which consists in subjecting successive portions of a confined body of hulls to the action of the teeth of a moving saw passing between closely adjacent ribs whereby successive portions of said hulls will be removed from said confined body, will be broken and carried through said ribs and the fine particles of lint torn loose therefrom, brushing the hulls and lint so removed from the confined body downward through space in a scattered condition and passing a gentle current of air through said falling material to a lint discharge, the said current being sufficiently strong to carry off the lint but not the hulls.

2. The method of removing lint from cotton seed hulls and recovering the uncut seed from a mixture of cotton seed hulls and uncut cotton seed, which comprises subjecting a confined body of uncut seed and hulls to the action of the teeth of a moving saw whereby successive portions of said hulls will be removed from said confined body and fine particles of lint torn loose therefrom separating the uncut seed from the confined body of seed and hulls, discharging the hulls and lint so removed downward through a space in a scattered condition and passing a gentle current of air through said falling material to a lint discharge, the said current being sufficiently strong to carry off the lint but not the hulls.

In testimony whereof I affix my signature.

HUGH E. SESSIONS.

Copies of this patent may be obtained for five cents each, by addressing the "Commissioner of Patents, Washington, D. C."